June 18, 1968  A. K. OZAI-DURRANI  3,388,998
PROCESS OF PREPARING A QUICK-COOKING BEAN
Original Filed Aug. 16, 1962
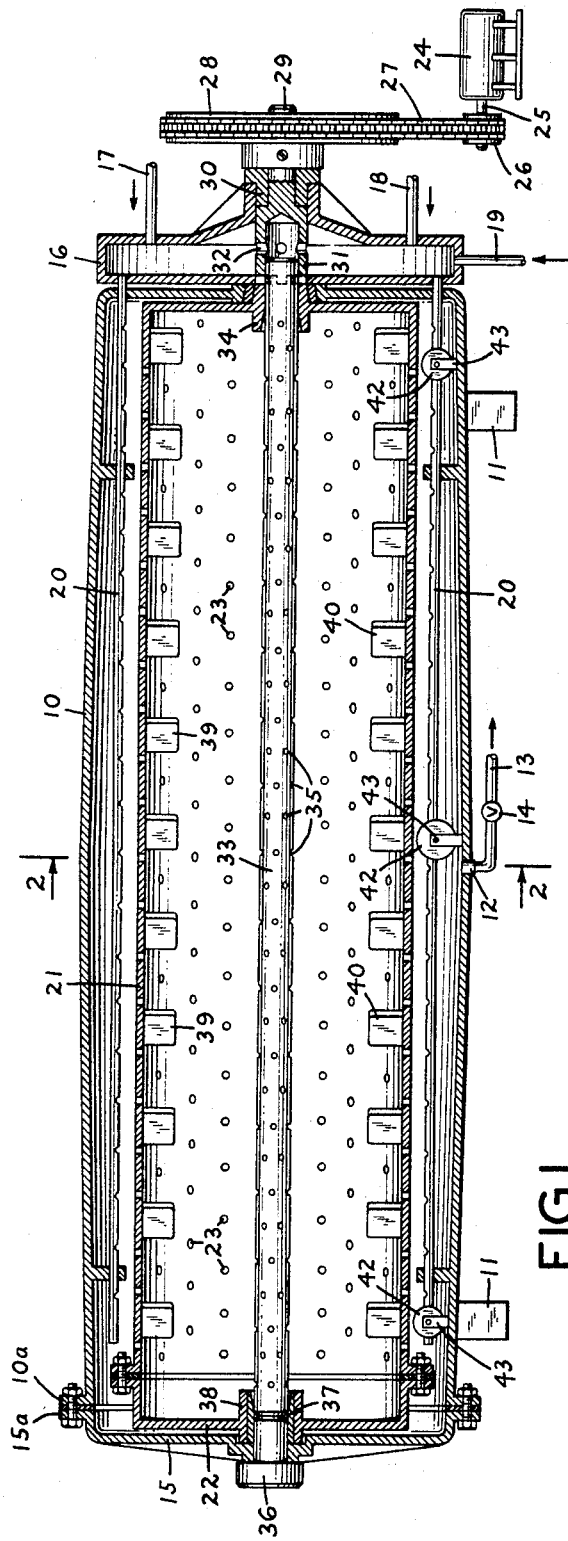
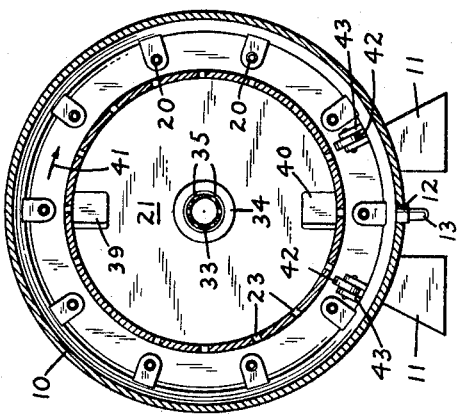

3,388,998
PROCESS OF PREPARING A QUICK-COOKING BEAN
Ataullah K. Ozai-Durrani, deceased, late of Stuttgart, Ark.; James R. Cherry and The Chase Manhattan Bank, executors of the estate of said Ataullah K. Ozai-Durrani
Continuation of application Ser. No. 217,409, Aug. 16, 1962. This application Apr. 21, 1967, Ser. No. 633,356
5 Claims. (Cl. 99—98)

ABSTRACT OF THE DISCLOSURE

Process of preparing a bean product comprising subjecting raw beans to heat and moisture to cook the beans and to increase their moisture content to between about 50–70% and then drying the beans to reduce the moisture content to about 10–15% by applying heat and sufficient pressure to substantially close any minor fissures and breaks which may have been created during the heating and drying.

---

This application is a continuation of applicant's copending application Ser. No. 217,409, filed Aug. 16, 1962, now abandoned.

This invention relates to methods of treating beans of a large variety of different types, in the edible category, as harvested and removed from their pods to convert them into a highly desirable form, in which they may be rendered suitable for human consumption with little or no cooking. The beans forming the starting material used in the practice of the method will normally have moisture content of from 5–15%, by weight. In instances in which it may be found practicable to treat the beans, in accordance with the present invention, after they have matured in the pod and before the beans have dried to any substantial extent, either within their pods or after removal from their pods, they will contain a higher moisture content, between 18 and 65%, and will then result in an end product having certain additional advantages.

An important purpose of the invention has been to produce an end product of the character mentioned which retains substantially all of the valuable nutritional ingredients of the original beans, and which retains substantially the shape and general appearance of the original beans, without appreciable rupturing or opening out of the bean structure. In certain situations, the invention contemplates the removal of some undesirable components of the original beans or the addition of some desirable components to the original beans to render them especially suitable for human consumption. By way of example, such special treatment may be applied to soy beans, which have not heretofore been widely considered to be in the category of beans for human consumption, due to their high fat or oil content and the like. It has been found possible, in accordance with the invention, to treat such beans in a way to remove some of the fats and oils and to add other desirable ingredients, such as starches, minerals and vitamins. As a result of such special treatment, soy beans have been produced in a form requiring little or no cooking to produce a highly attractive and tasty food preparation.

The treatment of the original, raw beans to convert them into the form requiring little or no cooking to incorporate them in a tasty, wholesome and highly nutritious preparation preferably involves the steps of first soaking the beans to cause them to absorb moisture to such an extent that the moisture content is increased to about 50–70% of the total weight of the soaked beans. This soaking step may be carried out in any suitable way to insure the desired increase in the moisture content of the beans. The latter, in a relatively dry form with a moisture content of between about 5–15%, and a suitable quantity of water may simply be introduced into a stationary tank or drum and allowed to stand for a sufficient number of hours, say 3–18 hours, to increase the moisture content to the desired extent. However, some advantage may be derived from the soaking of the beans in just the amount of water the beans are capable of absorbing to bring their moisture content to the desired point. This will eliminate the danger of some loss of the desirable ingredients of the original beans, as may take place if an excessive amount of water is applied and then withdrawn and discarded. When the amount of water added to the beans is substantially just that which the beans are capable of absorbing, it has been found desirable to impart some motion to the beans and the water as the beans are being soaked. This may be accomplished, for example, by introducing the beans and the water into a revolving drum which is revolved at a relatively low speed, say about 1 r.p.m., during the soaking period. The resulting movement and change of relative position of the beans within the mass being treated will insure bringing all of the beans into contact with the water to substantially the same extent, so that all of the beans will absorb substantially the same amount of water and prevent the skins from rupturing or separating from the grain.

If matured in the pod, garden beans, of the character mentioned above, are used as the starting material, the soaking step may be eliminated or greatly reduced. If the moisture content of the matured in the pod, garden beans is about 18–50%, then a short period of soaking or no soaking is required. If their moisture content is below that desired for the subsequent treatment of the beans, then a certain amount of soaking is desirable. Before soaking, the beans may be heated, by any known means, to about 95–150° C. and hydrated with water sprays at about 50–98° C. to saturate the beans. After heating, the beans may even be submerged in water at about 50–98° C. until, in about 60–120 minutes, the beans are saturated. Preheating expels most of the entrapped air and gelatinizes starches and conditions other constituents for quicker and better cooking beans in a shorter steaming period to homogenize the beans.

When the beans have been soaked to bring their moisture content to the desired point, they are subjected to a heating step to bring about a mealy and homogenized condition of the interior structure of the beans. This heating step may be carried out in any of a variety of different ways. For example, the beans may be placed in a revolving drum or tank and then subjected to the action of steam that is introduced into the tank under a suitable pressure, which will raise the pressure within the tank up to between say 1–50 lbs. per square inch gauge. The steam may be continuously introduced into and withdrawn from the tank, or it may be simply introduced and allowed to remain within the tank for the period of time required, provision being made for the removal of any excess condensate. Heat may also be supplied, by electrical or other means, to maintain the steam at the desired temperature within the tank. The duration of the steam treatment will vary somewhat in accordance with the nature of the beans being treated. In general it may be said that the steam treatment may be carried out for from 2 to 45 minutes depending upon the character of the beans. In applying the present invention to Michigan Navy beans it has been found desirable to subject the saturated beans to an initial treatment with steam under a pressure of 10 lbs. gauge for 15–25 minutes and then to retain the beans at the elevated temperature, with just enough introduction of further steam as may be needed to maintain the desired temperature, for another 10 minutes.

Before the heating step mentioned above, it has been found quite desirable and effective to first subject the beans to a tempering action at a temperature below 100° C., preferably between 90° and 95° C., for a period of 10 to 150 minutes and to then raise the temperature within the heating vessel or drum to 100° C., or somewhat higher, to insure plasticising or cooking or homogenization of the beans. This second heating step may be carried out for a period of 2 to 40 minutes. Such two stage heating may be effected by the use of steam or through the supply of heat in any other suitable way.

It has been found highly desirable in connection with the heating and cooking of the beans to perform it in such a way as to maintain a relatively high moisture content in the beans commensurate with the content upon soaking, and preferably slightly higher.

Following the cooking treatment, the beans are subjected to drying under controlled conditions to provide a final product suitable for packaging, which has substantially the same appearance as the original beans, except for a slight change in color and the development of hardly noticeable fissures in the skins of the beans. Thus the final product, which may be prepared for serving within the period of only minutes, has a wholesome aroma, a very attractive appearance, and has almost all of the nutritive components of the original beans. Through the use of certain special steps, in one or more of the stages of the process, the final product may be rendered edible without cooking. Therefore the beans may be used as a very appealing cold snack.

An important feature of the invention, which has been found to bring about the final product in substantially its original whole bean form, is the subjection of the beans, in certain stages of the process and particularly the cooking and drying stages, to a certain amount of pressure or compression which serves to retain the beans in their original shape. Various means may be employed for imparting the desired pressure, but it has been found particularly effective to impart it through the treatment of the beans in a rotating cylinder, which is rotated at a relatively slow rate, sufficient to cause the beans to pass successively from a zone of substantially no pressure through a zone of increasing pressure up to a certain maximum but not too high a pressure, and then back to a zone of no pressure. In this way all of the beans of a large quantity being treated may be subjected to the same changes in pressure with the overall result that the beans retain their original shape and wholeness and enlarged volume. A variety of different methods may be employed for imparting the desired pressure or compression on the beans as they are being treated, but the employment of a rotating cylinder, revolved at a speed of between .5 and 5 r.p.m., as the treating tank or vessel for the beans has certain definite advantages. Yet other means for applying pressure and compression to the beans as they are being soaked, cooked and dried may be employed. For example, the desired pressure or compression may be imparted to the beans by enclosing them within a container subjected to oscillatory or gyratory or eccentric movements. Also it may be imparted by applying a movable head or closure to a tank containing the soaking beans, said head being urged against the contents of the tank by gravity or by any suitable pressure providing means. In fact, any known means for applying a small pressure or compression to a confined mass, either continuously or in cycles, may be used to keep the beans in their orginal shape and prevent splitting apart of the beans and even wide opening of the beans. However, it is permissible, and sometimes even desirable, to let the beans open out to a substantial extent in the initial portion of the drying step and to then close up the large openings by compression in the later stages of drying. It is desirable to accomplish the stated result in a manner which will avoid excessive compression of any of the beans in a large quantity being treated and to subject all of the beans to substantially the same treatment. A rotating drum or cylinder, such as mentioned, has been found particularly well suited for the purpose.

While the final product has exceptional characteristics when the original raw beans are subjected to the series of steps described above, very definite advantages over any quick cooking beans heretofore produced may be obtained through the employment of other techniques for producing the homogenized and substantially cooked beans, which are then subjected to the drying step or steps explained to provide an end product in which the beans have a low moisture content, around 10–12%, have their original shape and appearance of wholeness, with only small fissures in their skins, and have an attractive glossy appearance. Thus, the beans may be homogenized by boiling them in water for the required length of time, with or without prior soaking. Or the beans, after soaking may be baked in any known manner. In fact any suitable way of cooking raw beans may be employed to convert them to the desired homogenized state without destroying the condition of wholeness of the individual beans. For example, electronic means involving ultra high frequency currents or means for imparting supersonic vibrations may be employed.

Before describing further the details of the problems involved in achieving the objectives of the invention in dealing with a wide variety of different types of beans, a brief description will now be given of a form of apparatus which may be used in the batch treatment of a quantity of beans to provide the desired quick cooking product. For this purpose reference will be made to the accompanying drawings, in which:

FIG. 1 is a schematic view, in longitudinal section of an enclosing cylinder or drum and an inner tank or container for the beans to be treated; and FIG. 2 is a largely schematic, cross-sectional view taken along the line 2—2 of FIG. 1.

In the apparatus shown in the drawings, the outer cylinder 10 is completely enclosed around its periphery and at its ends. This element of the unit may be suitably supported on the floor, or a supporting structure, by a plurality of legs 11 spaced in a longitudinal direction and also in a circumferential direction. The peripheral wall of the outer container is not truly cylindrical but has, at least its lower portion, sloping radially outwardly or downwardly from its ends toward its mid-point, so that water which may accumulate within the container in the course of carrying out the various operations may be readily drained through an outlet 12 connected with a pipe 13, the latter being provided with a valve 14 for opening or closing the discharge passage. At its left end (FIG. 1) the outer container 10 is provided with a removable head 15 which may have a radially extending flange 15a cooperating with a flange 10a on the main body of the outer cylinder. Any suitable means, such as bolts or the like, may be used for securing the head firmly to the main body of the container when the apparatus is to be placed in operation. Appropriate sealing means is provided to give a gastight joint between the removable head and the main body of the container.

At its right end (FIG. 1) the outer container has secured thereto an annular header 16 into which may be introduced at will either water or steam or cold or hot air or vacuum pump. Thus, steam may be introduced through a pipe 17 connected with any suitable source of supply, water may be introduced through a pipe 18 connected with any source of supply, and cold or hot air may be introduced through a pipe 19 connected with a suitable source of supply, or the header may be connected with an evacuating pump (not shown) to evacuate or reduce pressure within the container. It will be understood that the pipes 17, 18 and 19 are provided with valves for shutting off these lines or opening up one or another for delivery of the particular fluid desired in any cycle of the operation. One or more of the fluids will be introduced into the header at a particular time, and at certain times no fluid will be introduced into the header. Connected with the header at a number of points around its circumference are a plurality of perforated pipes 20 which extend into the main body of the container 10 throughout substantially its entire length. There may, for example, be provided about ten pipes 20 which are uniformly spaced circumferentially around the interior of the main body of the container quite close to the inner surface of the latter.

Within the outer container is adapted to be removably positioned a tank or drum 21 into which the beans to be treated may be placed. This drum has a removable head 22 which may be readily secured to or detached from the main body of the drum for the introduction and removal of the beans. In the use of the equipment, the drum may be filled and emptied while it is outside of the outer container 10, the cap 15 for the latter being detachable to enable the removal and introduction of the tank 21. The cylindrical wall of the latter is provided with a number of perforations 23 suitably distributed throughout the length of the tank and around its circumference, so as to enable the free passage of the water, steam or cold or hot air, or air withdrawn by a vacuum pump from the outer container 10, into or from the tank with uniform movement of the fluid over or through all portions of the beans within the tank. Openings 23 may be relatively large but must be of smaller diameter than the smallest beans to be treated.

Suitable means for rotating the tank 21 is provided. This may, for example, be accomplished by connections from a suitable motor and reduction gear mechanism represented schematically at 24. A shaft 25 is adapted to be driven by the motor and reduction gearing 24 at any desired slow speed, which may be varied as desired. To the shaft 25 is secured a pulley 26 which is connected by a belt 27 with a pulley 28 secured to a shaft 29 journaled in a bushing 30 retained within a hub portion of the header 16. In fact, if the various fluids are introduced into the container only through the various perforated pipes 20, the bushing for rotatably supporting the shaft 29 may be carried by a hub-like extension of the container 10 and the header may be of annular form. However, it has been found desirable to provide a perforated pipe (to be described) that extends longitudinally of the tank 21 along the axis of the latter. This makes possible the more even distribution of the various treating fluids through the mass of beans within the tank. To enable this to be done the shaft 29 has an enlarged portion 31, within the header, provided with a number of radial openings 32 extending into a bore within the head 31 into which the right end of a tube 33 extends. The latter is suitably secured within a hub portion 34 provided in the closure wall at the right end of the tank 21. Tube 33 does not extend to the inner end of the bore in head 31 and therefore leaves a cavity in the latter with which the openings 32 communicate. At its right end the hub 34 is provided with clutch teeth that cooperate with corresponding clutch teeth on the enlarged head portion 31 of the shaft 29 when the tank is properly positioned within the outer container. Tube 33 is hollow and is provided with a series of perforations 35 through its wall, these being disposed throughout the length of the tube and circumferentially around the tube. The latter is arranged to extend substantially throughout the length of the tank 21, as best shown in FIG. 1. Fluid from the header 16 passes through opening 32 into the cavity in head 31, then into the bore of tube 33 and is discharged into the tank through perforations 35. To support the left end of the tank 21 for rotation about a longitudinal axis, the removable cover 15 for the outer container 10 may be provided with a stud 36 arranged to extend into a bushing 37 carried by the removable cover 22 of the tank 21. Cover 22 may be provided with an inwardly extending flange 38 to retain the bushing 37.

If the beans are to be saturated with water to their maximum capacity, without any excess water to be discarded, a separate cylinder should be provided without wall perforations to stop loss of soaking moisture through the perforations. Provisions may then be made for introducing the desired amount of water into the cylinder through a tube or pipe, like 33, extending along the axis of the cylinder.

It will be seen from the foregoing that when the parts are assembled in the manner shown in the drawings, the tank 21 may be rotated at the desired speed by the connections from the motor and reduction gearing mechanism 24. As the tank rotates, the beans within it, which initially preferably fill only about one-sixth of the tank during the soaking period, but fill a little more than half of the space within the tank after the beans are soaked, will be given a tumbling action so that those which are at the bottom of the tank at one time during a revolution of the tank will be carried upwardly and placed at the top while those beans which are at the top at a particular point in the cycle will be carried downwardly toward the bottom. In this way all of the beans within the tank will be subjected to varying degrees of compression, created largely by the gravitational force of the beans above them at any particular point in the cycle. This gravitational force will be gradually varied between a maximum and a minimum as the beans are tumbled in the manner explained, due to the rotation of the tank.

If desired, the inner surface of the tank 21 may be provided at spaced intervals along its length with inward projections 39 and 40 which are disposed at an angle to a plane transverse to the longitudinal axis of the tank. As shown in FIG. 2 these inwardly extending projections 39 and 40 are located at diametrically opposite sides of the tank, and they are illustrated as being adapted to exert a pushing force on the beans in opposite directions longitudinally of the tank. Thus if the tank is rotated in the direction indicated by the arrow 41, the projections 39 as they pass downwardly into and through the mass of beans would tend to urge the beans that are engaged by these projections in a direction toward the right (FIG. 1). Projections 40, on the other hand, when engaged with the beans will tend to urge them toward the left in FIG. 1. If desired, all projections may be so inclined to the plane transverse to the longitudinal axis of the tank as to urge the beans in the same direction so long as the tank is rotated in a given direction, and the beans may be urged in the opposite direction by all of the projections if the tank is rotated in the opposite direction. While the projections 39 and 40 are shown in the schematic views as extending radially inwardly toward the axis of rotation of the tank, these projections may, if desired, be inclined at a suitable angle away from the true radial direction, so that they serve to push the beans either toward the longitudinal axis of the tank or toward the wall of the tank as they are also being pushed longitudinally of the tank.

In a typical unit of the foregoing character the outer container 10, preferably made of stainless steel or otherwise provided with an inner surface that is stainless, may be about 10 feet long and about 28 inches in diameter at its ends and about 32 inches at the mid-point. The inner tank or container 21 is slightly less than 10 feet long and may have a diameter of about 24 inches. This container is also preferably made of stainless steel. There may suitably be provided 15 of the injector tubes 20, spaced at equal angular distances about the periphery of the container 21 and having their perforations directed radially toward the axis of the container 21. Each of these injector tubes may be about 9 feet long and may be provided with 20 or more of the perforations mentioned. Each perforation may be 2 mm. in diameter, or they may vary from a slightly greater diameter at the left end (FIG. 1) to a slightly smaller diameter adjacent the right end, to insure substantially uniform discharge of the treating fluid throughout the length of the tubes. The tube 33 preferably extends throughout the length of the inner container and may have a diameter of 60 mm. This tube may be provided with 50 perforations, or more, each having a diameter of 2 mm., or varying slightly in the same manner as those in the tube 20, and are staggered around the surface of the tube so that the fluid passing through the tube will be discharged in all directions from the axis of the tube. The tube 33 is preferably made of stainless steel. Perforations 23 provided in the wall of the inner container may be of relatively large diameter, but not so large as to permit the passage therethrough of any of the beans to be treated. They are distributed uniformly around and lengthwise of the container. The inwardly extending fins or projections 39 and 40 may be equally spaced longitudinally of the container 21, approximately 10 inches apart, and those of each group are diametrically opposed to those of the other. The motor and reduction gear unit 24 is preferably of such character as to enable quick adjustment to vary the speed of rotation of the shaft 25 between .2 and 15 r.p.m. It is also adapted to reverse the direction of rotation of the shaft 25.

To facilitate the introduction and removal of the inner container 21, the outer container 10 may be provided with rollers 42 carried by brackets 43 extending inwardly from the inner surface of the outer container. These rollers are disposed in planes which are about 30° from the vertical plane through the longitudinal axis of the unit, and at opposite sides of such plane. Three sets of such rollers may be provided, as shown in FIG. 1. The arrangement should be such that when the inner tank is supported for rotation at its two ends, in the manner described, the outer surface of the inner tank will be spaced slightly from the periphery of the rollers 42. By making the central set of rollers of slightly larger diameter than those adjacent the ends of the tank, it is possible to rock the inner container 21 about the central set of rollers to a slight extent to facilitate alinement of the hub 34 with the passage through the right end of the container 10. Similarly, it facilitates the lifting of the left end of the tank 21 to aline the opening through bushing 37 with the stud 36 carried by the removable cover 15 for the outer container.

While for simplicity of illustration, the outer container 10 has been shown as provided with a removable head to enable the introduction and removal of the tank 21, the construction may be such that the outer container 10 is divided along a horizontal plane into two substantially semicylindrical sections so that the upper section may be removed from the lower section or hingedly connected with the latter. In this event the perforated tubes 20 in the upper section of the container 10 will need to be provided with disconnectable connections with outlets from the header 16, such connections being adapted to produce an effective seal between the outlets from the header 16 and the ends of the pipes 20. It will be understood that other minor changes will need to be made in the construction as a whole to bring about the proper cooperation between the bearing surfaces at the ends of the outer container and the cooperating portions of the tank 21.

In the use of the apparatus illustrated and described above, the head 15 of the outer container 10 may be removed and the tank 21 may be withdrawn from the container. The head 22 is then removed and a suitable quantity of beans to be processed may be introduced into the tank 21. The head or cover 22 may then be reapplied to the tank and the tank reintroduced into the outer container 10. The head 15 may then be reapplied to the outer container, care being exercised to introduce the stud 36 into the bushing 37 at the left end of the tank 21. As the tank 21 is introduced into the outer container care is exercised to aline the hub portion 34 of the tank with the opening through the right end wall of the outer container so that the toothed clutch portion of hub 34 will engage the toothed clutch portion of the enlarged head 31 of the shaft 29.

When the parts are thus assembled, a suitable amount of water may be introduced through the pipe 18, header 16 and the perforated pipes or tubes 20 and 33 to enable the soaking step to be performed. The tank 21 need not be rotated during the soaking period, from 2–16 hours, but the quantity of water introduced into the tank for the soaking treatment may be made somewhat less if the tank 21 is given a slow rotary movement of say 0.5 to 1 r.p.m. Such rotation of the cylinder will, as explained above, serve to subject all of the beans within the tank to substantially the same exposure to water and variations in compression during the long soaking period.

If desired, the amount of water introduced into the container 10, and through the openings in the tank 21 into the latter, may advantageously be substantially limited to the amount that the beans will absorb in increasing their moisture content from say 10% to 50–65%. This will serve to minimize the loss of any valuable components of the beans, as has been explained above. Whenever water in excess of the amount to be absorbed by the beans is introduced into the container 10 for the soaking treatment with this excess water may be readily withdrawn upon the completion of the soaking operation through the drainage line 13 by the opening of the valve 14 and may be reused for soaking other batches of beans.

When a series of separate units is provided, one for each of the several steps, the tank 21 of the soaking unit may be inperforate and all of the water used may then be introduced through the tube 33. The tubes 20 may be omitted from such a unit if desired. In fact such a unit could be employed for the conduct of all of the separate steps. In this event the outer container 10 may be omitted and the tank 21 may simply be supported at its two ends by suitable frame structures, with suitable header means at one end for enabling the introduction of the various treating fluids. Also, if desired, a single unit of the type illustrated may be provided with two interchangeable tanks 21, one being imperforate for soaking purposes and the other being perforated for use in the homogenizing and drying steps. When used for the soaking step, the imperforate tank facilitates limiting the water used to that which the beans are capable of absorbing.

In preparing beans of certain types to provide the desired dry, quick cooling end product, it has been found quite desirable to puncture the skins of the beans by the employment of needle-like elements at an early stage of the process. This may be done as the beans are being subjected to the soaking step of before or after the soaking step. It may be accomplished in any suitable way, as for example by placing the beans in a revolving tank having needle-like elements projecting inwardly from its inner wall. As this tank is rotated, all of the beans introduced into the tank will be forced under a suitable pressure against the needle-like elements so that the latter will penetrate the skin of each bean in spaced areas to facilitate the passage of the various fluids into and out of the interior of the bean. This is particularly desirable in connection with beans, such as the black eye pea type, which do not open during soaking, homogenization or drying to provide the desirable fine cracks or fissures in the final product. However, it may advantageously be done to all types of beans to minimize the need for and the development of the fissures.

The beans are now ready for the second step in their treatment which involves cooking them, as by the introduction of steam under suitable pressure through the line 17, header 16 and the perforated pipes 20 and 33. The steam is preferably available from a suitable source under a gauge pressure of 100 lbs. per square inch. However, it is introduced into the container 10 at such a rate that the pressure within the latter gradually increases from atmospheric to about 2–50 lbs. per square inch gauge. This steam is blown through the beans as the tank 21 is revolved at about .5 r.p.m. over a period of 2 to 30 minutes, depending upon the nature of the beans being treated. The valve in the steam line is then closed and the beans are withdrawn immediately or the beans may be permitted to remain in contact with steam within container 10 for another 10 to 15 minutes. At the completion of this cooking period the steam, and any condensate produced, is withdrawn through the line 13 by opening the valve 14.

Before the foregoing cooking treatment, the beans may first be subjected to a tempering or preheating step by the introduction of hot water through the line 18, this water being introduced at a temperature of 90° to 95° C. in such quantity and for a period of time sufficient to raise the temperature of the beans to about 90° C. This may be accomplished in about 5 minutes. Then the hot water is withdrawn through the line 13. The beans so tempered get their skins softened in addition to being easier to homogenize. In lieu of using hot water for tempering purposes, steam under a high pressure, about 100 lbs. per square inch, may be introduced for a sufficient time to bring the pressure within the container from atmospheric to about 5 lbs. per square inch. Then the steam valve is shut off and the steam and condensate are withdrawn through line 13. Following the tempering treatment in whichever way this is carried out, steam under a suitable pressure, at a temperature of 110° to 115° C. is introduced through the line 17 in the manner previously explained. This is continued for a period of about 15 to 20 minutes. During both of these cooking steps the tank containing the beans is preferably rotated at a relatively slow rate of from 0.5 to 2.0 r.p.m.

Whatever method is employed for the cooking of the beans, the temperatures employed and the duration of the treatment should be such as to reduce the beans to a fine textured mealy condition. When this has been achieved, and the steam and condensate have been removed from the tank and outer container, the beans are ready for the drying step. For this purpose hot air is preferably used and this is introduced through the pipe 19 and header 16 into the perforated tubes 20 and 33 and thus blown through the body of beans by virtue of the perforations 23 in the tank 21. During the initial drying treatment the tank 21 may be revolved slowly, say at .2–.5 r.p.m., and it will be found that the removal of a substantial percentage of the moisture content of the beans, down to 40–45%, in about 10 minutes will bring about, in some types, such as Navy, Great Northern, Pinto, large limas. small whites and the like, varying extents of gapping or opening out of the beans. Then the rate of rotation of the tank will be gradually increased to about 4 r.p.m., while the hot air is still being blown through them. This more rapid rotation of the tank during the continued drying of the beans serves to cause the latter to be subjected to adequate pressure forces to cause the openings or gaps to be substantially closed and the beans will assume the general appearance and shape and lustre which the original dry beans had. The slight fissures through the skins of the beans will hardly be noticeable. After openings or gaps have thus been closed, in about 10 minutes, the speed of rotation of the tank is reduced to about .5–1 r.p.m. and the drying with hot air is continued for about 20 minutes until the beams have a moisture content of only about 10 to 15%. Throughout the drying with hot air the discharge line 13 is left open for the removal of air with the moisture which it has picked up.

Just before the completion of the drying step, cold air is circulated through the beans and they are allowed to cool to a suitable temperature, around room temperature, and the outer container may then be opened by removal of the end cap 15, and the tank 21 may be removed from the outer container. The beans may then be discharged into a hopper for packaging in any suitable way.

It will be understood that the apparatus described above, and schematically shown in the drawings, is simply illustrative of a form of apparatus that may be employed in carrying out the process of the invention. The outer container may, for example, be so constructed that it is divided into two sections either along a horizontal plane extending through the longitudinal axis of the container or along a vertical plane perpendicular to the longitudinal axis of the container.

While the above-described apparatus is adapted only for batch operations, similar apparatus for continuous operations may readily be provided. This may be of the general character of that shown in the patent to Durrani, No. 2,758,031, granted Aug. 7, 1956. Thus the beans may be continuously fed from a hopper into a soaking tank, or a series of such tanks, and then fed from the latter to a succession of rotating drums or tanks. Suitable means may be provided for continuous introduction of the soaked beans into one end of a steaming tank and the cooked beans may be withdrawn from the opposite end of this tank and delivered to the adjacent end of a rotatable drying tank. The dried beans may then be discharged continuously from the opposite end of the drying tank into a hopper for packaging.

If desired, several steaming tanks and several drying tanks may be provided and connected in series. Thus the soaked beans may be introduced into a first steaming tank and discharged from this into another; from the latter they may be discharged into a first drying tank and then discharged from this into a second drying tank, from which the final product may then be discharged into a hopper. This will enable each tank to be operated continuously under the same conditions, as to speed of rotation, temperature and pressure maintained, and the like. Also, if desired, the soaking step may be carried out through the provision of one or more rotatable tanks of the same general type, placed in series with the others, in advance of the first steaming tank. Thus the same procedure discussed earlier in relation to a batch operation may be followed in soaking, cooking and drying the beans on a continuous basis. In a continuous process the soaking of the beans may, however, be conducted in a large stationary tank into which the beans are introduced at a suitable rate and from which they are withdrawn at the same rate and delivered to the tempering and cooking tanks and then to the drying tanks.

It will be understood that the apparatus mentioned will differ from that disclosed in the specified patent in that the containers for the beans in the cooking and drying stages will be in the form of rotating drums or tanks, and these may suitably be provided with helical members, in lieu of the projections 39 and 40 shown in FIGS. 1 and 2 of this application, extending inwardly from the inner surfaces of the bean containing tanks. The latter need not be surrounded by an outer container and may be nonperforated, so that the fluid introduced into each tank would simply be discharged into it through the perforations of an axially disposed tube, like tube 33 of FIG. 1. The helical, inwardly extending projection on the inner surface of each tank will serve to advance the beans at a desired rate longitudinally of the tank. Special means may be provided for either continuously or intermittently introducing into and withdrawing from each tank quantities of the beans to be treated.

Now having described in a general way the main objectives of the invention and certain apparatus which may be employed in carrying it out, the problems involved and various methods for achieving the desired end result will be described in further detail.

In achieving the foregoing ends, beans of any of a variety of different types are saturated with about 50–70% moisture to cause them to swell to their maximum, about 2–2.5 times their original volume; they are then heated in such a way as to homogenize their proteins and carbohydrates, vitamins, minerals, fats, oils and other constituents, and then dried to remove excess moisture from the swollen grains in such a manner as to preserve substantially their enlarged size and produce a spongy, porous, stratified structure with small breaks and fissures in the skins of the final beans, but without their being widely gashed or fragmented; and this is all done without substantial loss of nutritive values or alteration of the individual identity of the grains.

Most beans, such as small round, oval and kidney-shaped beans, like Lee, Hampton, Jackson and others of the soya bean type, and of the usual edible type dry beans such as California small white, Michigan Navy, marrow, pea, kidney, Arroz, Crabanza, lentils, black-eyed peas, mung, urd, lublub, muttur, Kabuli Chana, arhar, turtle, and similar types of beans, will within 60 minutes of soaking in water at 0° to 95° C., or below the homogenization temperature, have their skins become detached and formed into unruptured loose bags which sometimes are filled with water. In about 10 to 24 hrs., the beans saturate, and the skins get taut again. However, beans such as Calico, Angola, Lima, Horse Beans, Broad Beans, Fordhook, flat beans, Pinto, Great Northern and many such others, when subjected to conditions similar to those described above, will be found to have their skins loosen and stretch, and within about 60 minutes of soaking, the side tissures of the skins weaken and break, letting the stretching skin pull the cotyledons apart, and before water absorption has reached their half-way saturation mark, that is 25–30%, the cotyledons turn into a wide open yawn reaching the center of the bean. Gradually, as the absorption continues, the yawn narrows and when the bean has saturated, the gap closes and becomes almost invisible to the naked eye. Defection of skin and mutilation or destruction of the bean may be prevented by following the techniques of the present invention.

In making a product having the characteristics decribed above, the most important factor appears to be the manner in which the beans are soaked, homogenized and dried. The beans must first be treated under conditions so that they absorb enough moisture to cause substantial swelling (to 2–3 times their normal size) without the skins detaching and losing contact with the granular structure of the beans and to prevent them from fragmenting and departing from their unitary character and contour. Thereafter the beans should be properly and completely homogenized, and drying of the beans should then be conducted in such a manner that moisture is removed from the surfaces of the grains at a rate sufficiently slower than it can diffuse to the surfaces from the interiors of the grains so as to cause a highly humid environment to be maintained around the beans to keep their skins moist and elastic to withstand shocks and stresses which are caused by shrinkage during the drying of the interior of the beans. This serves to prevent fragmenting of the beans, which occurs if they dry without such control. This method of drying lets the beans keep substantially their swollen, expanded dimensions and retain their contour, shape and form after drying, with the result that they have a spongy-porous internal structure with only minor breaks and fissures in their skins without rupturing and fragmenting the beans as a whole. At the same time, the fissures in the skins enable the beans to hydrate readily and quickly when they are prepared for eating.

After homogenization the beans have about 50–70% moisture, part of which may be expelled, if necessary, by vacuum, but it is desirable to remove most of the excess moisture by drying to establish a stable moisture content of about 12%. Homogenized beans being a continuous mass with very little circulation of air through the various parts of their structure, there is a strong tendency to cause ruptures and fragmentations of the beans when they dry step by step from the surface inwards. It is therefore important to control the drying step to prevent such fragmentation and rupture.

Several specific examples of procedures which have been followed in certain test operations for the production of a quick cooking bean product, all of the individual beans of which have maintained their original shape and general appearance of wholeness will now be briefly described.

*Example 1*

100 lbs. of Michigan Navy beans having a specific gravity of .8678 and a moisture content of 14.30% were soaked in cold water, having a temperature of 22° C., for twelve hours. This was done in a stationary container in which the beans were all immersed in the soaking water. After soaking, the beans were found to be a temperature of 25° C. and were found to have a moisture content of 55.5% and a specific gravity of .7555. These soaked beans were placed into a tank or container of the character schematically shown at 21 in the drawings, and this container was placed within an outer container of the character indicated at 10 in the drawings. The beans were steamed for 15 minutes by introducing substantially dry steam, through injection tubes of the character indicated in the drawings, into the inner container under a pressure of 10 lbs. per square inch gauge. During this period the inner container was rotated at .75 r.p.m. At the end of the 15-minute period, the beans were retained within the container at the elevated temperature therein for another ten minutes, and the condensate and remaining steam with withdrawn. The beans were then removed from the container and found to have a moisture content of 55.7%. In this condition the beans were placed in trays with perforated bottoms having an overall length of 10 feet and a width of 20 inches. Air at a temperature of 110° C. was then forced through the beans on the trays at the rate of 300 cu. ft. per minute, the air being distributed evenly over the surface of the beans on the trays and being forced through the beans and outwardly through the perforations in the bottoms of the trays. After 10 minutes of this air blowing procedure, the beans were found to be at a temperature of 70° C. and to have a moisture content of 44%. Substantially all of the beans were found to have ruptured and opened up to a certain extent but none had broken apart.

The partially dried beans were then placed in the revolving container or cylinder in which the steam treatment had been carried out. At this time the bean containing cylinder was rotated at higher speeds than during the steaming treatment, and hot air having a temperature of 110° C. was blown through the beans, by the means schematically shown in the drawings, at the rate of 300 cu. ft. per minute. It was found that in about 30 minutes the moisture content of the beans could be reduced to the desired point of 12.5% and the beans were found to have a specific gravity of .6825. During this drying stage of the beans, the cylinder containing them was rotated 3.9 r.p.m. for about 15 minutes, and this was found to bring about substantially complete closing of the gaps which had developed in the beans in the course of drying them in the trays. The speed of rotation of the cylinder was then reduced to 2 r.p.m. and the beans were subjected to the further drying action of the hot air for the balance of the time required to reduce the moisture content to 12.5%.

To determine the cooking quality of the beans treated in the manner, described, one cup of the beans was introduced into two cups of water in a beaker and the mixture was boiled for five minutes. The beaker containing the beans and water was then covered and allowed to stand for another five minutes. At the end of this period the beans were found to be an excellent edible product.

*Example 2*

As another example of a procedure followed in producing a quick cooking dry bean product in accordance with the invention, the beans were soaked in the same manner as explained in Example 1. The soaked beans were then transferred to the rotatable container for the steaming or cooking treatment. Steam under a pressure of 100 lbs. gauge was introduced into the container while the latter was being rotated at .75 r.p.m. The introduction of the steam under such pressure was continued only until the pressure within the container had risen from atmospheric to 5 lbs. gauge. The steam was then shut off and the condensate and remaining steam was removed from the container through the discharge line at the bottom of the outer cylinder. Then further steam was introduced into the container and within about a minute the pressure was found to rise to 10 lbs. gauge. By adjustment of suitable pressure reducing valves the steam then delivered into the container was maintained at 10 lbs. gauge, and the steaming of the beans at that pressure was continued for 15 minutes. At the end of that period the delivery of steam into the container was cut off and the container was exhausted of its residual steam and condensate in about two minutes. At this time the perforated cylinder containing the beans was removed from the outer container and a sample of the beans was analyzed for its moisture content, temperature, weight, volume and pliability. The bean container was then restored to its position within the outer container and the beans were then dried by the injection of hot air at a temperature of 110° C. and at a rate of 300 cu. ft. per minute through the perforated pipes schematically shown in the drawings. During the first ten minutes of this drying step, the bean containing cylinder was rotated at only 1 r.p.m. and the beans were found to open up to a certain extent, as they had done in the trays of Example 1. The speed of revolution of the cylinder was then increased to about 4 r.p.m. and in the course of about 15 minutes the beans were found to have closed up and assumed their original form, with the fissures created by the opening up of the beans being almost imperceptible. The speed of rotation of the cylinder was then reduced to 2 r.p.m. while hot air was continued to be blown into the cylinder for another 15 minutes. At the end of this treatment the beans were removed and found to have substantially the same characteristics as those treated in accordance with Example 1.

*Example 3*

100 lbs. of large lima beams having a volume of 66.75 litres at 15° C. and having 12.85% moisture content were placed in the revolvable cylinder and sprayed with water at 18° C. temperature for 10 hours and 18 minutes; the initial speed of rotation of the cylinder was .2 r.p.m. for 60 minutes and this was gradually increased to 3.1 r.p.m. and kept at this speed for the remaining 9 hours, 18 minutes. Circulatory and horizontal movements were imparted to the beans by the rotation of the cylinder and the action of the fins to keep the beans alternately fully exposed and then compressed on all possible sides. Raising of the speed of rotation served to create greater compression force to be exerted so that the skins did not rupture and the cotyledons did not break open into jaws, causing damage or harm to the unitary character of the beans. Substantially all the water sprayed onto the beans was sucked into the beans; there was hardly any surplus water. The beans were removed and weighed 103 kilograms and had a volume of 142 litres at 15° C. temperature; their moisture content was 61.66%. The beans were then placed in the rotatable cylinder again, and their temperature was raised to 95° C. gradually in 60 minutes by blowing steam through them. There was 6 kg. of condensed water at 90° C. which was removed from the cylinder. Steam was again introduced into the cylinder and in 1 minute, with the cylinder revolving at about 3 r.p.m., the temperature of the beans was 101° C. The beans were kept moving for 3 more minutes, with the steam and their temperature maintained for that period. The steam was stopped, and warm air at 100° C. temperature was then blown through the beans to remove any water vapor without letting the beans cool. The beans at this time had 5% moisture content and were found to be completely homogenized, plastic, soft and mealy. Their color was slightly creamy. Rotation of the cylinder was reduced to .2 r.p.m., as the beans were too soft to stand any greater momentum during removal of their moisture, with air at 110° C. temperature being introduced at a rate of 350 cu. ft. per minute. After an hour, the velocity of the rotation of the cylinder was increased to 1 r.p.m. and gradually to 4 r.p.m. The beans were dried to 11.6% moisture and were about 25% larger than the original beans. One cup of the beans placed in 1½ cups of boiling water immediately sank to the bottom, and in about half a minute began to float; as the water was kept boiling for 2 minutes the beans formed a slight soup at the bottom and the beans as a whole floated between the top and the bottom of the body of water. They were found to be completely cooked, soft, and had the aroma of fresh-cooked garden beans; their moisture content was 71%.

*Example 4*

A similar batch of lima beans was treated in the same manner as the above but after the tempering treatment at 95° C. they were steamed for only 1½ minutes and then dried. They were found to be lighter in color, firm grains which took ten minutes to cook in boiling water and were fragrant and firm.

*Example 5*

10 kilos of beans, which had been homogenized in accordance with Example 1, were divided into two parts. One part was spread out to lose its moisture to dry at atmospheric conditions, and was found to be broken up and shattered after 3 days of drying. The other 5 kilos were placed between two cotton sheets through which air was circulated until the beans were dried. Blowing of the air through the sheets and beans served to subject the latter to mild pressure. Most of the dried beans were whole grains; only about 10–15% were broken and shattered.

Samples of various quick cooking bean products produced from Michigan Navy beans in accordance with the foregoing examples were analyzed to determine their thiamine, riboflavin and protein contents. These were found to be as indicated in the following table:

| Sample | Thiamine, mg./gm. | Riboflavin, mg./gm. | Protein, percent |
|---|---|---|---|
| A | 2.50 | 1.00 | 6.13 |
| B | 2.80 | .80 | 6.07 |
| C | 2.66 | 1.00 | 6.13 |
| D | 2.60 | .75 | 6.25 |
| E | 2.80 | 1.00 | 6.25 |

From other analyses conducted in connection with raw dry beans, it has been found that the final product of the invention has very little, if any, loss of the various desidable constituents that were present in the original beans. This includes not only the components referred to in the table above, but also the sugar, dextrins, starch, pentosans, hemi-cellulose, cellulose, acids, waxes, and the like.

To insure maintenance of a good color of the final product which resembles as closely as possible that of the original beans, steps may be taken to exclude as far as possible the presence of oxygen in the course of cooking or homogenizing of the beans. Thus, the vessel containing the beans as they are to be homogenized may be subjected to vacuum to remove substantially all of the air therefrom and an inert gas may be introduced to replace the removed air. Also, in order to reduce the amount of air in the water that may be used in the homogenizing step, the water introduced into the cooking container or vessel may be heated to just below its boiling point before it is introduced.

In considering the compression aspect of the invention, it should be appreciated that an elastic body reverts to its former condition after compression is released, but a plastic body does not revert to its former condition after release of compression. Beans which have been homogenized, by any available cooking techniques, to an extent to provide a tasty and readily edible product are in the category of a plastic body. Therefore if the homogenized, plastic beans are compressed, and if the compression is not equally distributed over all areas, the beans will deform and will stay deformed unless corrective steps are taken to prevent or overcome the deformity. If such plastic beans are moved, rotated and rolled, to cause them to exert their own pressure on the deformed areas, these areas will tend to correct deformity and conform to their original contour within the dimensions of the skin and if the movement of the beans is properly accelerated, then the deformity will eventually be reduced to almost zero. In the practice of this invention, any tendency of the beans to deform during the cooking and drying steps is overcome or corrected by the application of compression forces of the character indicated. Other procedures than those described above may be resorted to for the purpose of applying the desirable compression forces.

When the beans are soaked to increase their moisture content, in the initial step of the process, it is desirable to use, as nearly as possible, only the amount of water which the beans are capable of absorbing. In some cases, however, the beans may be sprayed with, or immersed in, more water than they can absorb within a reasonable time. This results in excess water which must be withdrawn from the mixture before it is subjected to the cooking step and in some instances it may result in the loss of valuable ingredients of the original beans. The beans may or may not be preheated and tempered at a temperature below the real cooking temperature before they are actually cooked. Preheating and tempering bring about structural modification of the interior components of the beans which assists in producing better self-cooking beans; preheating also helps reduce the amount of condensate produced in the cylinder during the real cooking step. For the real cooking step, steam at sufficiently high temperature is then brought into contact with the beans. Within about .5–5 minutes the temperature in the cylinder rises to about 102°–115° C. and that of the beans to 90°–95° C. Condensed water vapor, if any, is collected in the trap 12 and is continuously or intermittently withdrawn from the cylinders. This is to avoid any substantial reabsorption of water by the beans. The beans are maintained at about 95° C. temperature for from 15 minutes to about 4 hours, depending upon the nature of the beans being treated, while the cylinder is rotating at .5 r.p.m. The steam is then shut off and the condensate removed. After this, steam is let into the cylinder again until the temperature in the cylinder rises to about 115° C. and that of the beans to 99°–105° C. The beans gradually change from an elastic to an almost plastic condition, soft and mealy. The .75 r.p.m. speed and 115° C. temperature in the cylinders, and 99°–105° C. temperature of the beans are maintained for just such time as will transform the beans from an elastic to a plastic state. However, if the original color of the processed beans is to be preserved the time of heating is lessened to homogenize the beans to a point just short of acquiring absolute plasticity. The steam supply is then cut off and the cylinders are evacuated to about 25 inches of mercury pressure (evacuation is optional in most bean processing) to remove any excess water vapor and to cool the beans to some extent in about 10 minutes. The beans are then in a homogenized condition.

As a modification, the dietary deficiency of some types of beans can be overcome by addition of the deficient element to the beans. For instance, soy beans have no starch; this deficiency is reflected in the beans as finally cooked for the table. It is primarily for this reason that soy beans have not been as well accepted as the usual dry beans. In order to overcome this deficiency, the starch content of soy beans is increased by intermixing the beans with a suitable quantity of powdered bean starch. Thus raw, dry pinto beans may be finely ground and a quantity of this equal to say 20% of the weight of the homogenized soy beans, having a high moisture content and moisture on their outer surfaces may be thoroughly intermixed and the resulting product then dried in any of the ways explained. In a similar way finely ground beans of other types or finely ground, gelatinized rice may be added to the soya beans. As an alternative, modified soluble starches are added to the soaking fluid, which, finally, partially diffuses through the cellular structure of the grain. When such transfused beans are homogenized, dried, and prepared for the table, their taste and flavor are improved considerably.

Other deficiencies can also be partially remedied by soaking the homogenized beans in a solution of minerals, vitamins, etc.; or the homogenized beans, prior to drying, may be glazed with an adhesive mixture of the deficient materials in an amount sufficient to bring the bean to the usual proportions of proteins, carbohydrates, minerals, vitamins, and the like that are to be found in the most commonly used dry beans. This can be accomplished in any suitable way, as by intermixing the beans with a suitable quantity of the adhesive mixture to coat the outer surfaces of all of the beans, or by spraying the adhesive mixture in a fluid form onto the beans as the latter are rotated and tumbled in the revolving cylinder.

Spices, meat extracts, and the like may be added for seasoning and coloring, individually or in suitable combination, to the soaking solution so as to impart to the beans the desired taste and flavor. For example, if the beans are to acquire the usual taste and flavor of home-cooked baked beans, they are soaked in a preparation of molasses, meat juices, salt, pepper, etc., before or after the homogenization of the beans.

When beans are frozen at any one of the stages indicated and are then thawed, the thawing beans feel wet to touch and actually liberate 5–15% free moisture in the form of water which collects on their surfaces. This liberated water may be utilized to wet the dry supplementing bean granules or starch or the like applied to the beans and then causes the powder to adhere to the bean surface. The coating thus applied is smooth and free from fractures. In removing the superfluous thawed water, which must be gotten rid of either by reabsorption or by drying, the appearance of the beans, from which the thawing water is utilized as a moistener of the coating powder, is much smoother. The powder applied to the surfaces of the beans may be of a desirable color or it may be given a selected color by the addition of suitable certified food coloring materials, and thus enhance consumer acceptance.

Soy beans have a greater concentration of oil. If the oil and fat contents (about 18%) are considered undesirable, the oils and fats are reduced by extracting them with any hydrocarbon or other such medium that does not affect the bean detrimentally as food. As an example, after the completion of drying with or without the addition supplements to overcome the deficiencies, the beans may have about 5% to 10% moisture; they are then submerged in petroleum, ether, or hexane at the boiling temperature (about 59° to 70° C.) of the treating liquid. The hydrocarbon diffuses through the bean and dissolves the fats, and the solvent with the dissolved fats may be withdrawn and collected in a conventional manner. Sufficient time is allowed to dissolve and remove from the beans such an amount of the fats and oils as is desired. The beans are preferably heated to about 130° C. temperature to cause rapid boiling of the hydrocarbon and its rapid removal from the beans along with the fats. This treatment has been found to cause the beans to have a lighter shade and also to inhibit any enzymic action, thus producing a bean product more satisfactory to the consumers of the usual type of dry edible beans.

It will be appreciated from the foregoing detailed description of the invention that it may be carried out in a variety of ways to achieve the highly desirable result of providing a bean product in a dry state, which has substantially the same attractive appearance as the original raw beans, and which may be prepared for eating in a very short time. The beans retain substantially all of their nutritive value, are very palatable, and have a good aroma.

As is made clear by various passages in the foregoing description the term "homogenize" as used herein is intended to refer to the cooking of the beans into a plasticized and mealy condition, so as to render them ready for consumption without the necessity of further cooking.

What is claimed is:

1. A process of preparing a bean product adapted for quick preparation for consumption which comprises subjecting raw beans to heat and moisture to cook their constituents into a condition desired for consumption and to provide them with a moisture content of between about 50–70% with substantial swelling of said beans, and then drying the swollen beans by applying heat thereto in a manner to remove moisture from their surfaces at a rate slower than it can diffuse thereto from their interiors, thereby causing only minor breaks and fissures without seriously gashing and fragmenting of the beans, and applying limited pressure to the beans, said pressure being sufficiently small to maintain the beans in their enlarged condition and shape with a spongy, porous structure therein, said pressure being of sufficient amount to substantially close the minor breaks and fissures created in the outer surfaces of the beans.

2. A process of preparing a bean product adapted for quick preparation for consumption which comprises cooking beans having a moisture content in excess of 50% at a temperature of between 100° C. and 150° C. until their proteins and carbohydrates are rendered plasticized and mealy and ready for consumption without further cooking, said cooking being conducted under such conditions of moisture and pressure as to be accompanied by substantial swelling of the beans and increase in their moisture content to at least about 55–70%, thereafter drying the beans by removing moisture from their surfaces at a rate sufficiently slower than it can diffuse thereto from their interiors as to cause openings and fissures to be formed in the outer surfaces of the beans but without gashing and fragmenting of the beans, and mechanically applying only sufficient pressure to the surfaces of all of the beans in their enlarged condition to restore them to a substantially closed form with a spongy porous structure therein.

3. A process of preparing a bean product adapted for quick preparation for consumption which comprises soaking and cooking the beans in such amount of water as will be completely absorbed by the beans to a plasticized and mealy condition in which they are ready for consumption without the necessity of further cooking, accompanied with swelling of the beans to 2–3 times their original volume, their moisture content being raised to about 50–70%, and thereafter drying the beans by removing moisture from their exteriors at a rate sufficiently slower than it can diffuse thereto from their interiors as to cause moistening and elasticizing of the surfaces and creating fissures without gashing or fragmenting of the beans, said drying step being so conducted as to reduce the moisture content of the beans to below about 15% while retaining them in their enlarged condition, and subjecting the beans to a slight mechanical pressure during at least a part of the drying step, said pressure serving to close said fissures so that there are no apparent openings in the surfaces thereof and said beans have a spongy porous interior structure.

4. A process of preparing a bean product adapted for quick preparation for consumption which comprises soaking the beans in water at a temperature below the cooking point of their proteins and carbohydrates for a sufficient period to cause them to absorb sufficient water to increase the moisture content of the beans to about 50–70%, then cooking the beans in water to plasticize their proteins and carbohydrates and cause additional swelling of the beans for a period sufficient to increase the moisture content of the beans to about 60–80% without causing any substantial disintegration of the beans, and thereafter drying the swollen grains by applying a slight mechanical pressure thereto and removing moisture from their exteriors at a rate sufficiently slower than it can diffuse thereto from their interiors so as to cause moistening and elasticizing of the surfaces and produce openings and fissures therein but without fragmenting of the beans, said mechanical pressure serving to close said openings and fissures, and said drying step being so conducted as to set the beans in their enlarged condition and produce a spongy porous structure therein.

5. A process of preparing a bean product adapted for quick preparation for consumption which comprises soaking raw beans at a temperature below the cooking point of their proteins and carbohydrates until they have absorbed substantially the maximum amount of water they are capable of absorbing at said temperature, then cooking the beans in a moisture containing atmosphere to cook their proteins and carbohydrates substantially and to increase their moisture content to between about 50–70%, and then drying the swollen beans by removing moisture from their surfaces at a rate sufficiently slower than it can diffuse thereto from their interiors so as to cause only minor breaks and fissures without gashing and fragmenting of the beans, and applying a sufficiently low pressure to maintain the beans in their enlarged condition in substantially the contour of the original beans with a spongy, porous structure therein, said pressure being sufficient to substantially close the minor breaks and fissures developed in the course of drying the beans.

References Cited

UNITED STATES PATENTS 2,813,796    11/1957    Keneaster et al. _____ 99—204

FOREIGN PATENTS 204,434    5/1956    Australia.

A. LOUIS MONACELL, *Primary Examiner.*

S. E. HEYMAN, *Assistant Examiner.*

UNITED STATES PATENT OFFICE
CERTIFICATE OF CORRECTION

Patent No. 3,388,998

June 18, 1968

Ataullah K. Ozai-Durrani, deceased

It is certified that error appears in the above identified patent and that said Letters Patent are hereby corrected as shown below:

Column 8, line 46, "cooling" should read -- cooking --. Column 9, line 49, "limas." should read -- limas, --. Column 12, line 11, "be a" should read -- be at a --; line 25, "with" should read -- were --; line 51, after "rotated" insert -- at --. Column 13, line 73, "5%" should read -- 59% --.

Signed and sealed this 9th day of December 1969.

(SEAL)
Attest:

Edward M. Fletcher, Jr.

Attesting Officer

WILLIAM E. SCHUYLER, JR.

Commissioner of Patents